_United States Patent_ [19]

Sato et al.

[11] 3,757,325

[45] Sept. 4, 1973

[54] SAFETY DEVICE FOR VEHICLE PASSENGERS

[75] Inventors: Kazuo Sato; Minoru Izawa, both of Toyota-shi, Japan

[73] Assignee: Toyota Jidosha Kogyo Kabushiki Kaisha, Toyota, Japan

[22] Filed: May 3, 1971

[21] Appl. No.: 139,353

[30] Foreign Application Priority Data
Dec. 18, 1970  Japan.............................. 45/113116

[52] U.S. Cl.............. 343/7 ED, 343/9, 343/112 CA
[51] Int. Cl.............................................. G01s 9/44
[58] Field of Search................ 343/7 ED, 9, 112 CA

[56] References Cited
UNITED STATES PATENTS

| | | | |
|---|---|---|---|
| 3,448,822 | 6/1969 | LaLone et el. .................... | 343/7 ED |
| 2,804,160 | 8/1957 | Rashid........................... | 343/112 CA |
| 3,442,347 | 5/1969 | Hodgson et al. ................. | 343/7 ED |
| 3,181,148 | 4/1965 | Schiffman et al. ............... | 343/7 ED |

_Primary Examiner_—Malcolm F. Hubler
_Attorney_—Toren and McGeady

[57] ABSTRACT

The potential collision detecting system for vehicles disclosed includes two transmitter-receivers provided at both lateral sides of a vehicle. One transmitter-receiver radiates an electromagnetic wave having the same plane of polarization as that of the wave generated by a generator and another transmitter-receiver radiates an electromagentic wave having a plane of polarization is turned 90 degrees from the first plane by means of a twist waveguide. When said electromagnetic waves are reflected from an obstacle, the reflected electromagnetic waves are returned along the same path as the radiated electromagnetic waves are picked up by both transmitter-receivers. Two separate Doppler signals are obtained through homodyne detection. An impending crash of a vehicle with another vehicle in its path is determined by calculating the ratio of electrical quantities proportional to the Doppler signals. Whether the relative speed between vehicles is within the range of critical speed or not is determined by obtaining the sum of voltages of the electrical quantities. Whether the relative distance between vehicles has come within the critical range or not is determined by obtaining the sum of the voltages proportional to the levels of the Doppler signals. When the results of said determination are all satisfied, a safety device for vehicle passengers is actuated.

26 Claims, 9 Drawing Figures

INVENTORS
KAZUO SATO
MINORU IZAWA
BY Toren and McGeady
ATTORNEYS

SAFETY DEVICE FOR VEHICLE PASSENGERS

SUMMARY OF THE INVENTION

This invention relates to a potential collision detecting system for vehicles, particularly of the type wherein the moving direction of an object in the vehicle path is determined by detecting the frequency shift of the electromagnetic wave radiated from a vehicle due to the Doppler effect and a predetermined signal is issued to actuate a safety device for vehicle passengers when the object in the vehicle path enters the crash region.

Conventional safety devices for vehicle passengers utilize air bags installed in a vehicle at locations which vehicle passengers are most likely to strike. The air bags are adapted to be inflated rapidly upon the occurrence of a collision so that the elasticity thereof can prevent secondary injuries of passengers caused immediately after the occurence of the primary crash. In order to actuate such a safety device for vehicle passengers, a known prior art system is adapted to detect the impact force resulting from a vehicle crash and to inflate the air bag by the explosion of gunpowder or the like during a quite short period of time between the occurrence of the primary crash of the vehicle and the secondary crash of passengers. However, in the detecting system utilizing impact force, the time interval for the actuation of the safety device is quite short, and therefore it is difficult effectively to control the actuation of the safety device in spite of the utilization of explosive force of gunpowder. Moreover, the handling of explosives is difficult and troublesome. Furthermore, in the event of the delay in the actuation of the safety device, the rapid inflation of air bags may have an adverse effect on the rapid inflation of air bags may have an adverse effect on vehicle passengers rather than protect them, resulting in more serious injuries to passengers.

In order to effect the above-described potential collision detection, the relative speed and the relative distance between vehicles are determined by detecting the frequency shift of the electromagnetic wave radiated from a vehicle due to the Doppler effect, as well as the signal level of the electromagnetic wave, thus obtaining a predetermined time allowance until the occurrence of a collision. At the same time, the electromagnetic waves reflected from an object in the vehicle path are received at two points on a vehicle, and the position of the object in the vehicle path is detected two-dimensionally in accordance with two quantities of electricity proportional to the difference frequencies between the frequencies of two reflected electromagnetic waves and those of the radiated electromagnetic waves, thus preventing unwanted actuation of a safety device in the case of, for example, mere contact. In the potential collision detecting system of the type described, the electromagnetic waves reflected from an object in the vehicle path are received at two points on a vehicle in order to detect the position of the object two-dimensionally. In this case, however, if the planes of polarization of the electromagnetic waves to be radiated from the vehicle are the same, mutual interference of reflected electromagnetic waves is caused, and therefore there is possibility that an accurate Doppler signal due to the Doppler effect may not be obtained.

The object of this invention is to improve the above-described potential collision detecting system, and more particularly to prevent the mutual interference of two reflected electromagnetic waves.

According to a feature of the invention this object is attained by causing the planes of polarization of the electromagnetic waves radiated from a vehicle to deviate from each other by 90°.

More specifically, in order to attain the above-described object, this invention provides a potential collision detecting system of the type in which two transmitter-receivers are installed at both lateral sides of a vehicle and adpated to radiate electromagnetic waves to an object in the vehicle path and to receive reflected electromagnetic waves to obtain two Doppler signals. By means of the signals the relative angle between the moving direction of the vehicle and the object is determined, thus detecting the imminence of a collision. The potential collision detecting system for vehicles in which two transmitter-receivers are installed so that the plane of polarization of the electromagnetic wave radiated from one transmitter-receiver makes a right angle with that of the electromagnetic wave radiated from other transmitter-receiver.

These and other features of the invention are pointed out in the claims. Other objects and advantages of the invention will become obvious from the following detailed description when read in light of the accompanying drawings.

DESCRIPTION OF A PREFERRED EMBODIMENT

Figure 1:
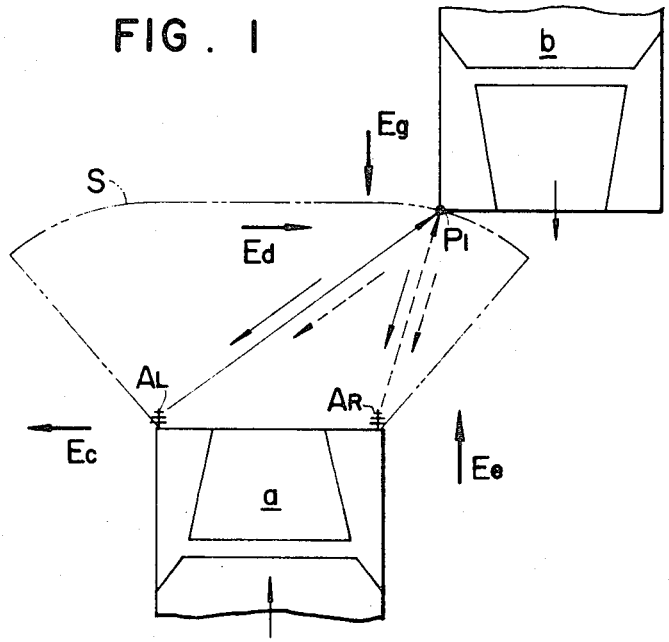
FIG. 1 is a sketch for explaining the principle of the potential collision detecting system for vehicles according to this invention.

In FIG. 1, a vehicle $a$ that is going to detect a potential collision is provided with two transmitting-receiving antennas $A_R$ and $A_L$ at the front portion thereof. The planes of polarization of the electromagnetic waves radiated from said two antennas deivate from each other by 90°. The vehicle a is approaching a vehicle $b$ in its path at a relative speed $v$. Under this condition, said two antennas $A_R$ and $A_L$ form a nearly fan-shaped object detecting range S due to the directivities thereof, as illustrated in alternate long and short dash lines. When the vehicle $b$ comes within the range S, the electromagnetic waves reflected from the vehicle $b$ are received by two antennas $A_R$ and $A_L$. It has been experimentally confirmed that the greater part of the reflected electromagnetic waves received by one antenna in this case are those reflected from a point $p_1$ or its vicinity on the vehicle $b$ which is at the minimum distance from said antenna. This point is referred to as "equivalent reflection point" hereinafter. The electromagnetic wave radiated from the antenna $A_L$ and reflected from the equivalent reflection point $p_1$ is picked up by the antenna $A_L$ as well as another antenna $A_R$. The electromagnetic wave radiated from the antenna $A_R$ and reflected from the equivalent reflection point $p_1$ is received by the antenna $A_R$ as well as another antenna $A_L$.

Now, the condition of the field planes of radiated electromagnetic wave and the reflected electromagnetic wave (to be referred to as "electric field E" hereinafter) will be described hereinbelow. The electric field E of the reflected electromagnetic wave is reversed by the equivalent reflection point $P_1$. That is the reflected wave is shifted 180 degrees in direction with respect to that of the radiated wave, but the plane of polarization thereof remains unchanged. Consequently, if the electric fields E of the radiated and reflected electromagnetic waves are to be indicated by the arrows, the electric field E of the radiated wave is indicated by E$c$ when the planes of polarization of the electromagnetic waves radiated from two antennas $A_L$ and $A_R$ are the same. On the other hand, the electric field E of the reflected electromagnetic wave is indicated by E$d$. When the plane of polarization of the electromagnetic wave radiated from the antenna $A_R$ deviates 90° from that of the wave radiated from the antenna $A_L$, the electric field E of the reflected waves is indicated by E$e$. On the other hand, the electric field E of the reflected electromagnetic wave is indicated by E$g$.

When the planes of polarization of the electromagnetic waves radiated from two antennas $A_L$ and $A_R$ are the same, the planes of polarization of the reflected electromagnetic waves also are the same. Thus, the antenna $A_L$ receives the reflected electromagnetic wave returning along the same path as that of the electromagnetic wave radiated therefrom, and also receives the electromagnetic wave radiated from another antenna $A_R$ and reflected, thus combining them. The antenna $A_R$ receives the electromagnetic waves and combines them in the same manner as the antenna $A_L$. The thus combined reflected electromagnetic waves are subject to homodyne detection by using the electromagnetic waves radiated from respective antennas $A_L$ and $A_R$ as reference signal, thus obtaining two Doppler signals. At this time, two combined reflected electromagnetic waves take different paths $D_1$ and $D_2$, and therefore their phases are combined. When the path difference $D_{21}$ satisfies the condition $D_{21}=\lambda/2 \cdot n$ ($n = 1, 2, 3 ...$), two reflected electromagnetic waves are combined with their phases reversed. When the plane of polarization of the electromagnetic wave radiated from the antenna $A_R$ deviates 90° from that of the wave radiated by the antenna $A_L$, the plane of polarization of the reflected electromagnetic wave derived from the antenna $A_R$ deviates by 90° from that of the reflected wave derived from the antenna $A_L$. Consequently, the plane of polarization of the reflected electromagnetic wave derived from the antenna $A_L$ or $A_R$ is different from that of the electromagnetic wave derived from the antenna $A_R$ or $A_L$, and therefore such an electromagnetic wave is not received. In other words, the antenna $A_L$ and $A_R$ receive only the reflected electromagnetic wave being returned along the same path as the electromagnetic wave radiated therefrom. Thus, two separate Doppler signals are independently obtained through homodyne detection.

Figure 2A:
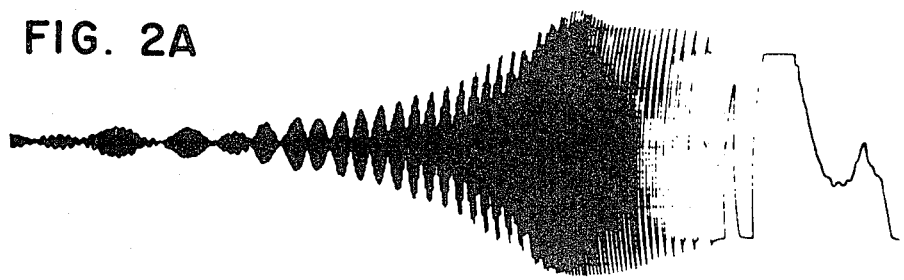
FIG. 2A illustrates waveforms of the Doppler signals obtained in case when the electromagnetic waves radiated from two antennas of FIG. 1 are polarized in the same plane.
Figure 2A:
Figure 2B:
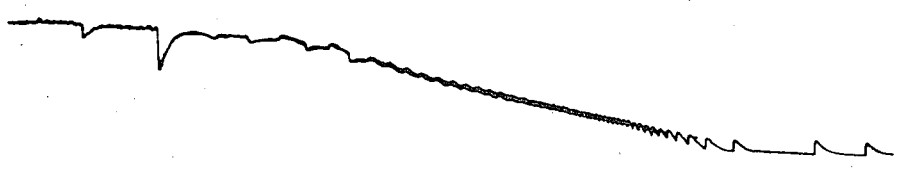
FIG. 2B is a characteristic diagram illustrating the quantities of electricity proportional to the frequencies of said Doppler signals.
Figure 2B:
Figure 3A:
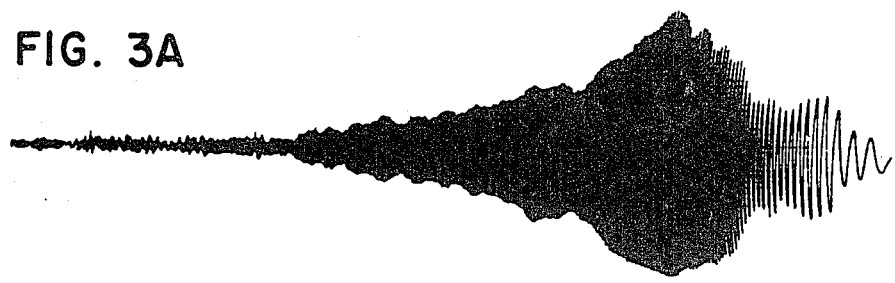
FIG. 3A illustrates waveforms of the Doppler signals obtained in case when the planes of polarization of the electromagnetic waves radiated from two antennas of FIG. 1 are deviated by 90°.
Figure 3B:
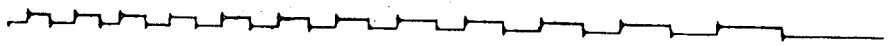
FIG. 3B is a characteristic diagram illustrating the quantities of electricity proportional to the frequencies of said Doppler signals.
Figure 3B:
Figure 3B:

When the planes of polarization are the same, the waveforms of the Doppler signals obtained by two antennas $A_L$ and $A_R$ vary due to mutual interference, thus causing amplitude fluctuation, as shown in FIG. 2A. The voltages proportional to the frequencies of said Doppler signals also fluctuate as shown in FIG. 2B. When planes of polarization differ by 90° the waveforms of the Doppler signals obtained by two antennas $A_L$ and $A_R$ are normal without any interference, as shown in FIG. 3A. The voltages proportional to the frequencies of the Doppler signals vary smoothly as shown in FIG. 3B. As is apparent from these figures, the potential collision detecting system according to this invention in which the planes of polarization of the electromagnetic waves radiated from two antennas $A_L$ and $A_R$ differ by 90° is more advantageous over the system in which the planes of polarization are the same.

Figure 4:
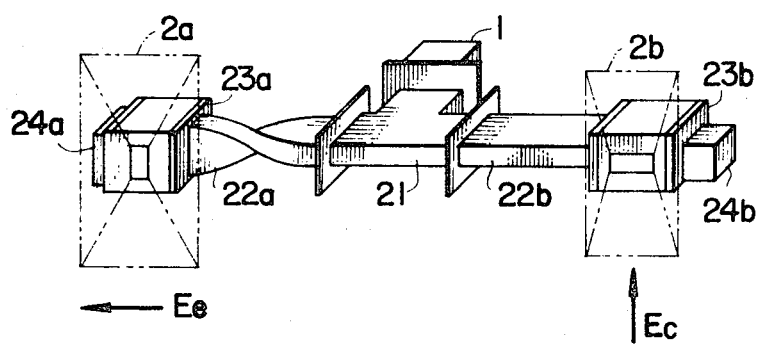
FIG. 4 is a perspective view of an embodiment of the device to be used for deviating the planes of polarization of two antennas by 90°.

The device for obtaining the planes of polarization of radiated electromagnetic waves that differ by 90° are described with reference to an embodiment illustrated in FIG. 4. In FIG. 4, an ultrashort wave generator 1 has its output divided in two directions by means of a T-shaped branch tube 21, one side being connected through a connecting canal 22$b$ and a circulator 23$b$ to an antenna 2$b$ and a detector 24$b$, and other side being connected through a twist waveguide 22$a$ and a circulator 23$a$ to an antenna 2$a$ and a detector 24$a$. Thus, the antenna 2$b$ is supplied with the electromagnetic wave generated by the generator 1 and radiates the electromagnetic wave having the electric field E whose direction is E$c$. The antenna 2$a$ is supplied with the electromagnetic wave generated by the generator 1 and having the plane of polarization deviating 90°, thus obtaining the direction E$d$ for the field E of the electromagnetic wave to be radiated. A bend waveguide, a flexible waveguide or other type of waveguide may be used instead of the twist waveguide 22$a$.

Aspects of potential collision detection when the positions of a vehicle and another vehicle in its path are parallel and when another vehicle is obliquely approaching is described with reference to FIGS. 5 and 6.

Figure 5:
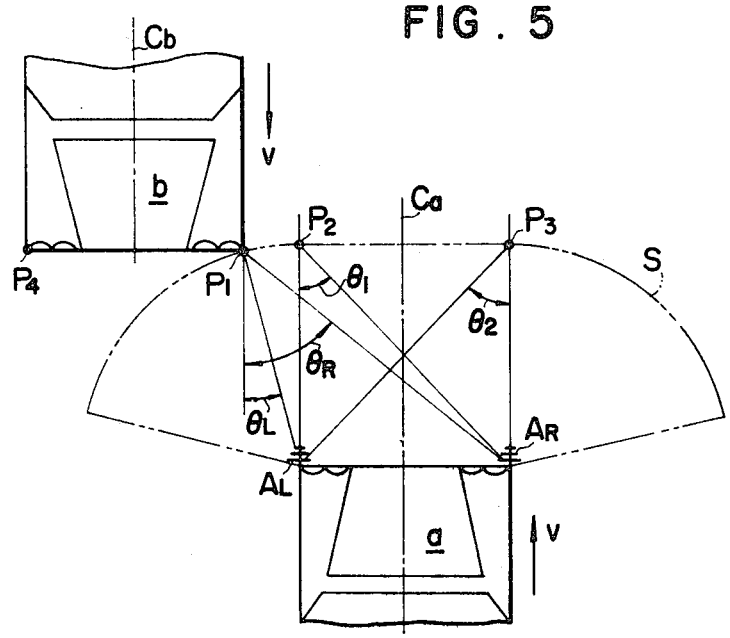
FIG. 5 is a sketch illustrating a case when the position of a vehicle is in parallel with that of another vehicle in its path.

In FIG. 5, the moving direction of a vehicle $a$ is in parallel with that of another vehicle $b$ in its path. In FIG. 5, the relative velocity is indicated by $v$, and the center lines of the vehicles $a$ and $b$ are shown by C$a$ and C$b$, respectively. The object detecting range formed by the antennas $A_L$ and $A_R$ of the vehicle $a$ is indicated by S. The equivalent reflection point of the vehicle $b$ is indicated by $p_1$, and a point in the front corner on the side opposite to the equivalent reflection point $p_1$ is indicated by $p_4$. The intersections of the left and right lateral sides of the vehicle $a$ with the range S are indicated by $p_2$ and $p_3$, respectively. The angles between the lines connecting both antennas $A_L$ and $A_R$ to the equivalent reflection point $p_1$ and the moving direction of the vehicle are indicated by $\theta_L$ and $\theta_R$, respectively. In general, when the electromagnetic wave having the frequency $f_t$ is radiated, the frequency of the Doppler signal derived from the Doppler-shifted reflected electromagnetic wave is expressed by the following equation, in which c is the propagation speed of the electromagnetic wave.

$$fd = 2vf_t/c$$

Consequently, the frequencies $f_{dL}$ and $f_{dR}$ of the Doppler signals obtained by the antennas $A_L$ and $A_R$ having the angles $\theta_L$ and $\theta_R$ between the moving direction of the vehicle and the travelling direction of the electromagnetic wave are determined as follows.

$$f_{dL} = 2vf_t/c \cdot \cos \theta_L$$
$$f_{dR} = 2vf_t/c \cdot \cos \theta_R$$

Let the quantities of electricity proportional to the Doppler signal frequencies $f_{dL}$ and $f_{dR}$ be $V_L$ and $V_R$, respectively. Then, their quotient is represented by the following formula.

$$V_R/V_L = \cos \theta_R/\cos \theta_L$$

It is apparent from the above formula that the quotient $V_R/V_L$ is determined by the ratio of cosine of the angles $\theta_L$ and $\theta_R$ formed between the direction of the electromagnetic waves radiated from the antennas $A_L$ and $A_R$ and the moving direction of the vehicle. There exists a relationship between the quotient $V_R/V_L$ and the discrepancy of the center lines Ca and Cb. When both center lines Ca and Cb coincide, the angle $\theta_L$ becomes equal to the angle $\theta_R$. Therefore, $V_R/V_L$ becomes equal to 1. When the center line Cb moves toward the point $p_2$ with respect to the center line Ca, the angle $\theta_L$ becomes smaller than $\theta_R$. Thus, $V_R/V_L$ becomes smaller than 1. When the point $p_1$ overlaps with the point $p_2$, the angle $\theta_L$ becomes equal to zero and the quotient $V_R/V_L$ becomes equal to $\cos \theta_1$. Furthermore, if the center line Cb moves toward the point $p_3$ with respect to the center line Ca, the angle $\theta_L$ becomes larger than $\theta_R$. Consequently, the quotient $V_R/V_L$ becomes larger than 1. When the point $p_4$ overlaps with the point $p_3$, the angle $\theta_R$ becomes equal to zero and the quotient $V_R/V_L$ becomes equal to $1/\cos \theta_2$.

As is apparent from the above description, when the quotient $V_R/V_L$ becomes larger than $\cos \theta_1$ but smaller than $1/\cos \theta_2$, the vehicle b is always in the crash region between the point $p_2$ and the point $p_3$. On the other hand, when the quotient $V_R/V_L$ is smaller than $\cos \theta_1$ or larger than $1/\cos \theta_2$, the vehicle b will not crash with the vehicle a but they pass each other. As described above, the potential collision detecting system according to this invention detects the occurrence of a collision between the vehicle a and the vehicle b by determining whether or not the ratio of two quantities of electricity proportional to the Doppler signal frequencies obtained at two antennas $A_L$ and $A_R$ is in a predetermined range.

Figure 6:
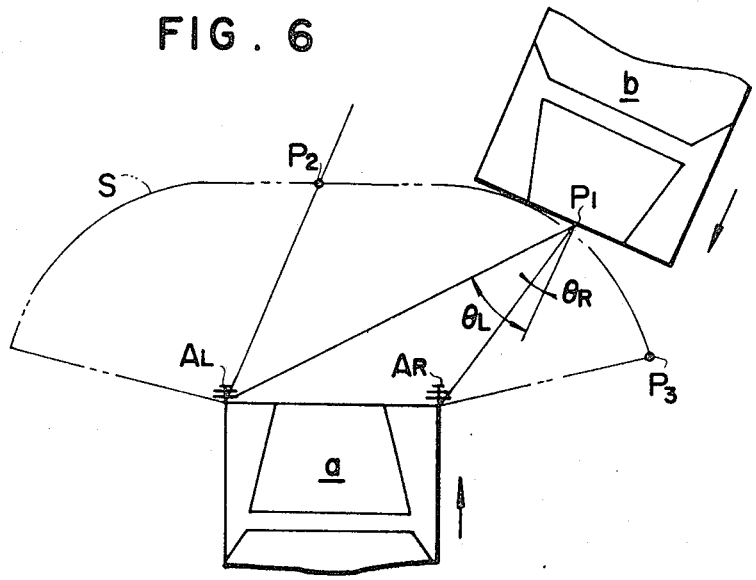
FIG. 6 is a sketch illustrating a case when the relative position between vehicles is oblique.

FIG. 6 illustrates a case when the vehicle b is approaching the vehicle a obliquely from ahead. The relative speed is indicated by v. The equivalent reflection point in the center of the vehicle b with respect to the region S is indicated by $p_1$. The angles between the lines connecting the antennas $A_L$ and $A_R$ to the equivalent reflection point $p_1$ and the moving direction of the vehicle are indicated by $\theta_L$ and $\theta_R$, respectively. The crash limit points on the range S are indicated by $p_2$ and $p_3$, respectively. In this case, the quantities of electricity $V_L$ and $V_R$ proportional to the Doppler signal frequencies obtained at the antennas $A_L$ and $A_R$ are determined in the same manner as in FIG. 5. The imminence of a crash is detected by determining whether or not the quotient $V_R/V_L$ is in a predetermined range. In addition to the above-described detection of a vehicle crash, the direction of approach of a vehicle in path is determined. That is, if the quotient $V_R/V_L$ is smaller than 1, it is determined that the vehicle b is approaching the vehicle a from the left side. When the quotient $V_R/V_L$ is larger than 1, it is determined that the vehicle b is approaching from the right side.

Figure 7:
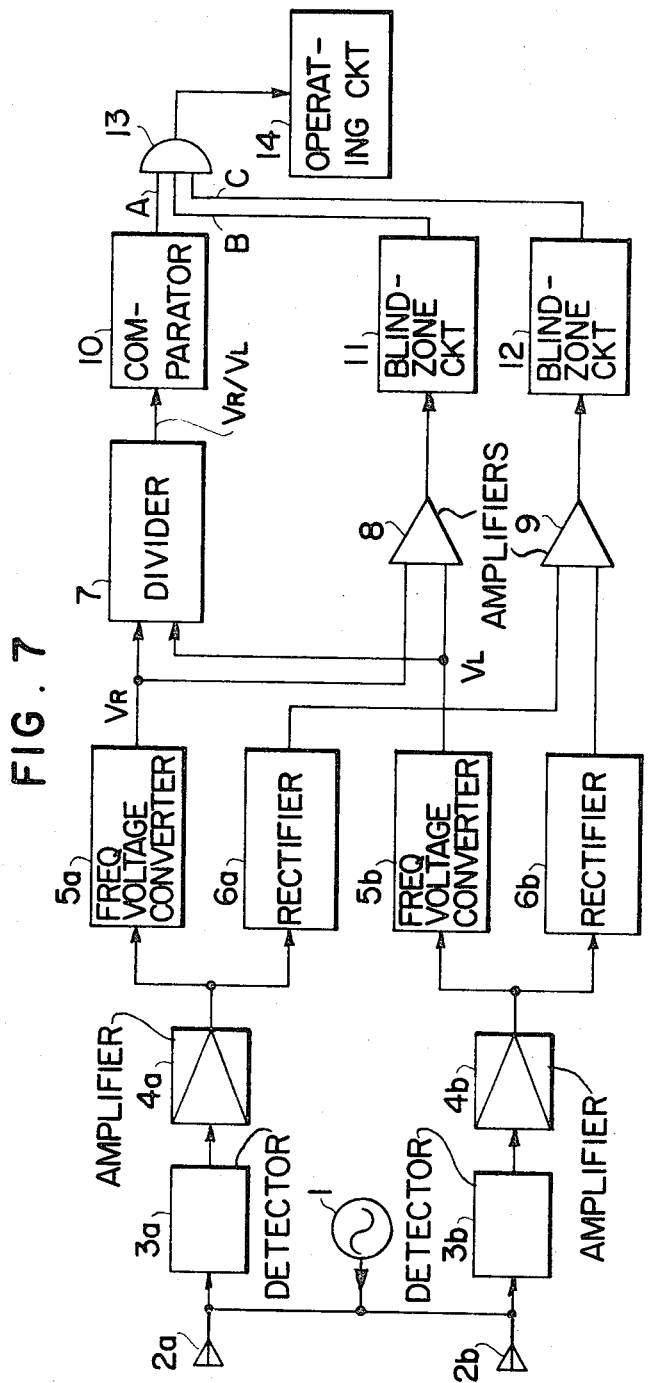
FIG. 7 is a block diagram of an embodiment of the device to be used for effecting the potential collision detecting system for vehicles according to this invention.

An embodiment of the above-described potential collision detecting system according to this invention will be described hereinbelow with reference to FIG. 7. A part of the electromagnetic wave generated by the ultrashort wave generator 1 is radiated from the transmitter-receiver 2b. Other part of said electromagnetic wave is radiated from the transmitter-receiver 2a with its plane of polarization deviating from the first part by 90°, as shown in FIG. 4. Thus, the reflected electromagnetic waves having no mutual interference are received by both transmitter-receivers as shown in FIG. 1. The reflected electromagnetic waves are subjected to homodyne detection by means of detectors 3a and 3b. Thus, two Doppler signals as shown in FIG. 3A are obtained and are amplified by amplifiers 4a and 4b, respectively. After that, the voltages $V_R$ and $V_L$ proportional to the frequencies of the Doppler signals as shown in FIG. 3B are derived by means of frequency-voltage coverters 5a and 5b. The two voltages $V_R$ and $V_L$ are divided by a divider 7 to obtain the quotient $V_R/V_L$. Then, the quotient is compared with the predetermined range by means of a comparator 10, thus applying the output A to an AND circuit 13 when the vehicle is in the crash region.

The two voltages $V_R$ and $V_L$ are added by an adder 8 and are compared by a blind zone circuit 11 to determine whether the sum of these voltages is exceeding a predetermined range. Since the sum of voltages is proportional to the relative speed, the output B is applied to the AND circuit 13 when the relative speed between two vehicles is in the range of critical speed.

The Doppler signals from the amplifiers 4a and 4b are rectified by rectifiers 6a and 6b to derive the voltages proportional to the levels of the Doppler signals. The voltages are added by an adder 9 and are directed to a blind zone circuit 12, where the sum of voltages is compared to determine whether it is within a predetermined range. Since the sum of voltages is inversely proportional to the relative distance between vehicles, the output C is applied to the AND circuit 13 when the relative distance comes within the critical range and the time allowance until the actual occurrence of a crash is obtained. Thus, when three outputs A, B and C are applied to the AND circuit 13, an operating circuit 14 is activated to inflate a safety device for passengers such as an air bag.

As described above, in the potential collision detecting system according to this invention, the planes of polarization of the electromagnetic waves radiated from two transmitter-receivers are deviated by 90°, and therefore the waveforms of the Doppler signals to be detected, the quantities of electricity proportional to the frequencies of said Doppler signals and others are obtained very accurately. Consequently, the possibilities for erroneous control of collision detection can be greately reduced and a high degree of reliability is ensured. Moreover, the crash region for an object in the vehicle path is determined by two-dimensional factors in accordance with the angles between vehicles, and therefore unwanted actuation in the case of mere contact can be prevented. Additionally, as a safety device for vehicle occupants is actuated by detecting the time allowance until the occurrence of a collision in accordance with the relative speed and relative distance, vehicle occupants are safety protected with certainty. In the embodiment described above, transmitting-receiving antennas are installed in the front portion of a vehicle so as to detect a head-on collision. However, such antennas may be installed at the lateral sides or in the rear portion of a vehicle so as to detect collisions from sideways or from behind.

While an embodiment of the invention has been described in detail, it will be obvious to those skilled in the art that the invention may be embodied otherwise.

What is claimed is:

1. An apparatus for detecting an impending collision between a vehicle and an object, comprising energy source means, first and second transmitter-receiver means coupled to said source means and separately located on the vehicle for radiating electromagnetic energy toward an object and for receiving electromagnetic energy reflected from the object, first Doppler detecting means coupled to said first transmitter-receiver means for producing a Doppler signal on the basis of the energy received by said first transmitter-receiver means, second Doppler detecting means coupled to said second transmitter-receiver means for producing a Doppler signal on the basis of the energy received by said second transmitter receiver means, and electrical means coupled to said first and second Doppler detecting means and responsive to said Doppler signals for producing a safety signal when the relationship between the Doppler signals falls within a predetermined range, said transmitter-receiver means each including polarizing means for polarizing the energy radiated by said first and second transmitter-receiver means so that the plane of polarization of the energy radiated by the first transmitter-receiver means has a component transverse to the plane of polarization of the energy radiated by the second transmitter-receiver means.

2. An apparatus as in claim 1, wherein said polarizing means each includes a wave guide, one of said wave guides being twisted relative to the other to produce the polarization.

3. An apparatus as in claim 2, wherein said polarizing means each includes a rectangular wave guide, one of said wave guides being twisted 90° relative to the other for producing the polarization.

4. An apparatus as in claim 1, wherein said transmitter-receiver means are each located to radiate and receive energy from and at locations sufficiently far apart so that the relative amplitude of simultaneous Doppler signals vary with the position of the object relative to the location.

5. An apparatus as in claim 1, wherein said transmitter-receiver means each includes a transmitter-receiver antenna, said antennas being horizontally spaced relative to each other.

6. An apparatus as in claim 5, wherein said polarizing means each includes a wave guide, one of said wave guides being twisted relative to the other to produce the polarization.

7. An apparatus as in claim 5, wherein said polarizing means each includes a rectangular wave guide, one of said wave guides being twisted 90° relative to the other for producing the polarization.

8. An apparatus as in claim 1 wherein said electrical means includes first and second converter means coupled respectively to said first and second Doppler detecting means for producing voltages corresponding to the respective Doppler signals, divider means coupled to said first and second converter means for producing a ratio signal representing the ratio of the voltages, and comparator means coupled to said divider means for producing a comparison signal when the ratio lies within a given range, and output means coupled to said comparator means for producing the safety signal.

9. An apparatus as in claim 8, wherein said electrical means includes adder means coupled to said Doppler detecting means for adding the level of the Doppler signals and producing an add signal, zone means for producing a zone signal when the add signal lies within a given range, said output means including gate means responsive to the comparison signal, said zone means being connected to said gate means, said gate means producing the safety signal only in response to the presence of a comparison signal and a zone signal.

10. An apparatus as in claim 8, wherein said polarizing means each includes a wave guide, one of said wave guides being twisted relative to the other to produce the polarization.

11. An apparatus as in claim 8, wherein said plarizing means each includes a rectangular wave guide, one of said wave guides being twisted 90° relative to the other for producing the polarization.

12. An apparatus as in claim 8, wherein said electrical means includes adder means coupled to said first and second converter means for adding the level of the voltages and producing an add signal, zone means for producing a zone signal when the add signal lies within a given range, said output means including gate means responsive to the comparison signal, said zone means being connected to said gate means, said gate means producing a safety signal only in response to the presence of a comparison signal and a zone signal.

13. An apparatus as in claim 12, wherein said electrical means includes second adder means coupled to said Doppler detecting means for adding the level of the Doppler signals and producing a second add signal, second zone means for producing a second zone signal when the add signal lies within the given range, said output means including gate means responsive to the comparison signal, said first and second zone means being connected to said gate means, said gate means producing the safety signal only in response to the presence of a comparison signal and both of said zone signals.

14. An apparatus as in claim 12, wherein said polarizing means each includes a wave guide, one of said wave guides being twisted relative to the other to produce the polarization.

15. An apparatus as in claim 13, wherein said polarizing means each includes a rectangular wave guide, one of said wave guides being twisted 90° relative to the other for producing the polarization.

16. An apparatus as in claim 1, wherein one of said transmitter-receiver means is sensitive only to radiation having a polarization component along one of the planes and the other of said transmitter-receiver means is sensitive to radiation having a polarization component along the other of the planes.

17. An apparatus as in claim 16, wherein the plane of polarization of the energy radiated by the first transmitter-receiver means is closer to being transverse than to being parallel to the plane of polarization of the radiated energy by the second transmitter-receiver means.

18. An apparatus as in claim 17, wherein the plane of polarization of the energy radiated by the first transmitter-receiver means is substantially transverse to the plane of polarization of the energy radiated by the second transmitter-receiver means.

19. An apparatus as in claim 17, wherein the plane of polarization of the energy radiated by the first transmitter-receiver means is transverse to the plane of polarization of the energy radiated by the second transmitter-receiver means.

20. An apparatus as in claim 1, wherein the plane of polarization of the energy radiated by the first transmitter-receiver means is closer to being transverse than to being parallel to the plane of polarization of the radiated energy by the second transmitter-receiver means.

21. An apparatus as in claim 20, wherein the plane of polarization of the energy radiated by the first transmitter-receiver means is substantially transverse to the plane of polarization of the energy radiated by the second transmitter-receiver means.

22. An apparatus as in claim 20, wherein the plane of polarization of the energy radiated by the first transmitter-receiver means is transverse to the plane of polarization of the energy radiated by the second transmitter-receiver means.

23. An apparatus as in claim 1, wherein said transmitter-receiver means each includes polarizing means for polarizing the energy radiated and received by the first and second transmitter-receiver means so that the plane of polarization of the energy radiated and received by the first transmitter-receiver means has a component transverse to the plane of polarization of the energy radiated and received by the second transmitter-receiver means.

24. An apparatus as in claim 23, wherein one plane of polarization is more transverse than parallel to the other plane of polarization.

25. An apparatus as in claim 23, wherein the planes of polarization are substantially transverse to each other.

26. An apparatus as in claim 23, wherein the planes of polarization are transverse to each other.

* * * * *